UNITED STATES PATENT OFFICE.

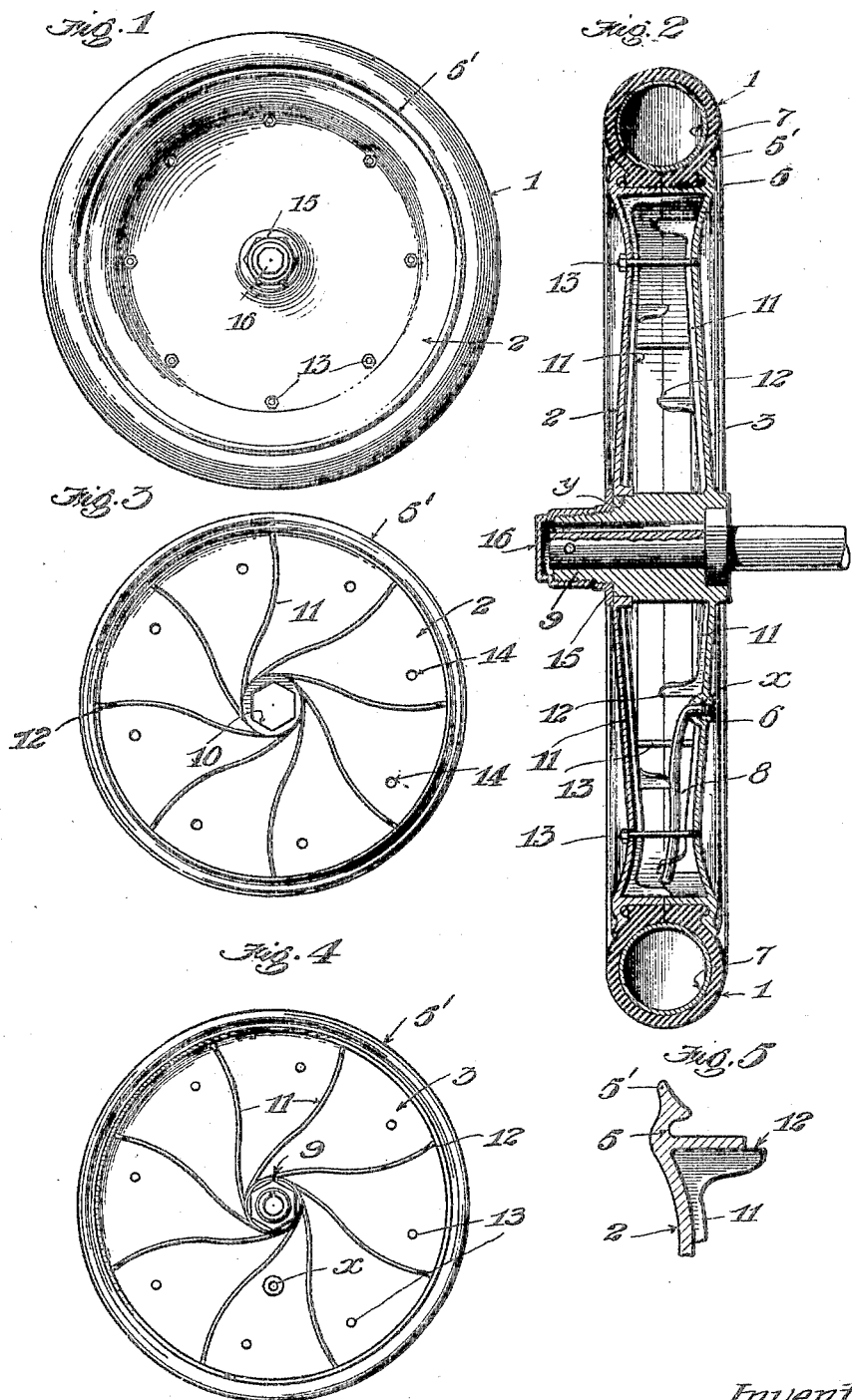

DAVID C. McCAN, OF LOS ANGELES, CALIFORNIA.

WHEEL.

No. 797,779.　　　Specification of Letters Patent.　　　Patented Aug. 22, 1905.

Application filed September 21, 1904. Serial No. 225,376.

*To all whom it may concern:*

Be it known that I, DAVID C. McCAN, a citizen of the United States, residing at Los Angeles, in the county of Los Angeles and State of California, have invented new and useful Improvements in Wheels, of which the following is a specification.

My invention relates particularly to spokeless wheels; and it consists in casting an inner and outer member and assembling these two members together to form a completed wheel. My wheel is particularly adapted for use on automobiles on which rubber tires are used; and it is the object of my invention to simplify the construction of wheels, to do away with the use of spokes, which have a tendency to retard the movement of the wheel and to scatter the dust by the rapid revolution thereof, to strengthen, lighten, and otherwise improve same, to so arrange the several parts that ready access may be obtained to the tire in case it becomes damaged, and to securely retain the inflated tire in place without the use of other securing means than the rims provided therefor on the wheel members.

I accomplish these objects by means of the device described herein, and shown in the accompanying drawings, in which—

Figure 1 is a side elevation of a wheel embodying my invention with a pneumatic tire in place thereon. Fig. 2 is a central vertical section thereof. Fig. 3 is an internal elevation on the outer member. Fig. 4 is an internal elevation of the inner member. Fig. 5 is a cross-section of a fragment of the rim of one of the wheel members on which is a fragment of one of the strengthening-ribs.

In the drawings, 1 is a pneumatic tire in place on one of my improved wheels. My wheel is composed of an outer member 2 and an inner member 3, cast separately and in such shape that they may be readily assembled, and thereby made to form a complete wheel. These members are cast out of suitable metals in the proper proportion to give strength, lightness, and rigidity to the wheel when assembled.

I have shown in Figs. 1 and 2 of the drawings an assembled wheel with a detachable tire in place thereon. On the usual annular clencher-rims 5 on the perimeter of the wheel I provide annular extensions 5' to prevent any lateral movement of the tire on the rim. The tire is secured to the rim by the union of the two clencher-rims, one on each member, and is held firmly by means thereof in place thereon. 6 represents the usual valve for inflating or deflating the inner tube 7. This valve is connected with the inner tube by means of the usual rubber tube 8 and projects through the inner member of the wheel at the point $x$. (Shown in Figs. 2 and 4.) At this point the valve is covered by a screw-threaded cap adapted for engagement in the screw-threaded opening in the inner member of the wheel. The inner member is cast with an outwardly-projecting hub 9, which projects when the wheel members are assembled through a central polygonal opening 10 in the outer member, the hub forming a seat at the point marked $y$ to engage and hold the outer member in register with the inner member. Extending radially from this opening 10 on the outer member and from the hub on the inner member and on the inner faces of these members are strengthening-ribs 11, which terminate in the inner rim of the members. The outer ends of these ribs 11 are enlarged and project beyond the rims of both members, forming seats 12 for the companion member to rest against and serving to interlock and hold the members securely together. Projecting through the members and at suitable distance apart are screw-threaded bolts 13, adapted to pass through openings 14 in the outer member and hold the members securely together. A nut 15 on the hub 9 forms additional means to hold these members in locked position together. The hub is screw-threaded at its outer end for the reception of a screw-threaded cap 16.

Having described my invention, what I claim as new, and desire to secure by Letters Patent, is—

1. A wheel composed of two members having inwardly-projecting peripheral flanges which come together and unitedly form a seat for the tire and provided with annular clencher-rims for retaining the tire on its seat, each member provided with projections which form seats for the inwardly-projecting flange of the other member.

2. In a spokeless wheel of the character herein described an inner member provided with an outwardly-projecting hub integral therewith, the said hub being adapted to project through a polygonal opening in the outer member, an outer member having a central polygonal opening therein for the reception of the hub of the inner member both members having interlocking ribs extending from the hub to the rim thereof and adapted to contact with the rim of the companion member and hold the members in locked engagement with each other.

3. The herein-described composite wheel made up of the outer cast member 2 and the inner cast member 3 said members being provided with radial ribs 11 and having projecting shoulders 12 thereon forming a seat for the rim of the companion member, the member 3 having a projecting hub 9 polygonal in form at the projecting end and adapted to pass into a polygonal opening 10 in the member 2 and means to hold said members together substantially as herein shown and described.

4. A wheel comprising two members provided with peripheral clencher-rims 5 and annular extensions 5', having inturned flanges which together form a seat for the tire, having internal ribs, which strengthen the members, projections 12 which form seats, for the flanges, a hub, and means for holding the members together at the hub and at various points between the hub and periphery.

In witness that I claim the foregoing I have hereunto subscribed my name this 14th day of September, 1904.

DAVID C. McCAN.

Witnesses:
HENRY T. HAZARD,
G. E. HARPHAM.